Sept. 27, 1932.  C. DENNIS  1,879,924
RAKE
Filed Oct. 21, 1929   2 Sheets-Sheet 1
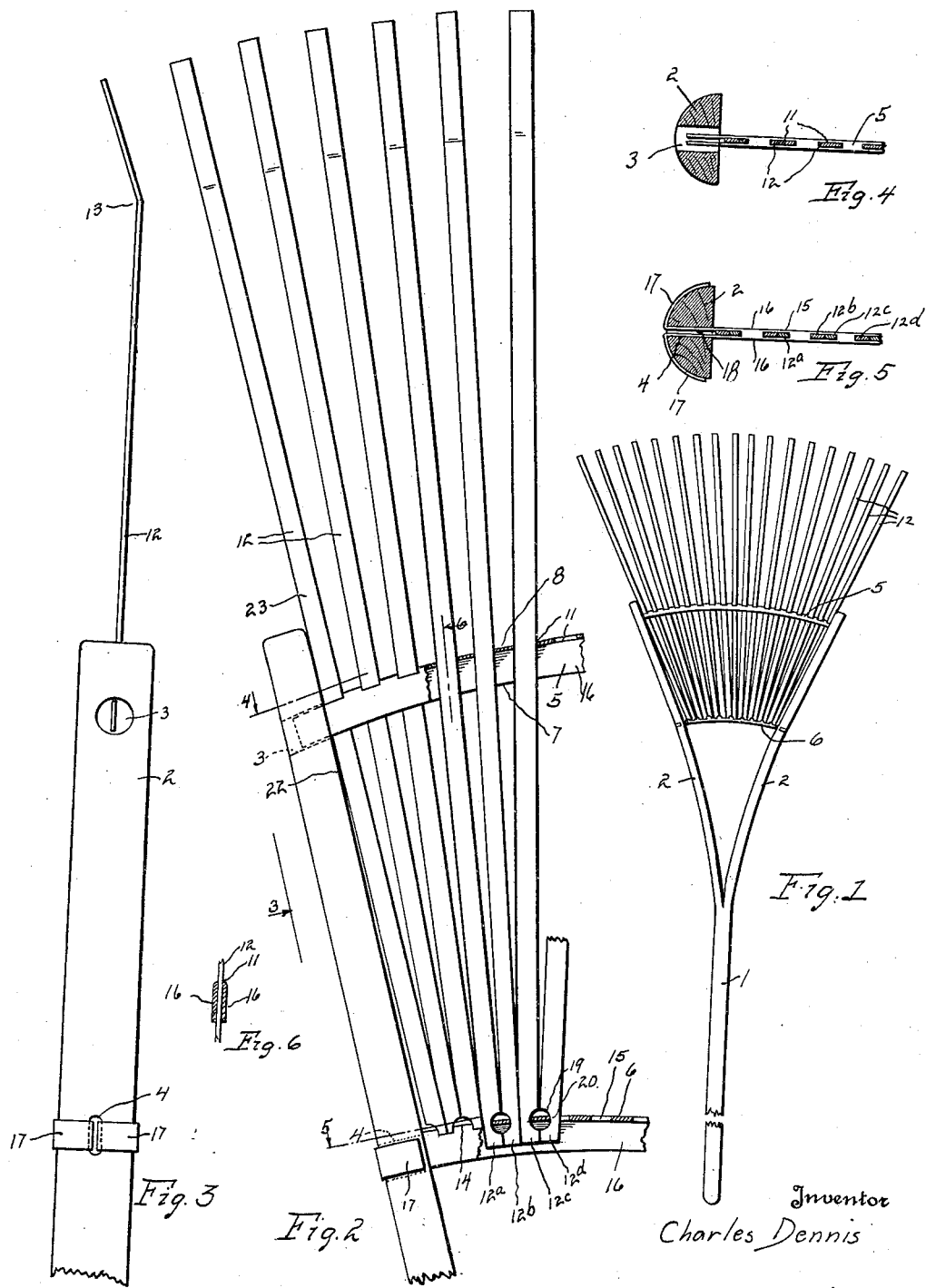
Inventor
Charles Dennis Sept. 27, 1932.  C. DENNIS  1,879,924
RAKE
Filed Oct. 21, 1929  2 Sheets-Sheet 2
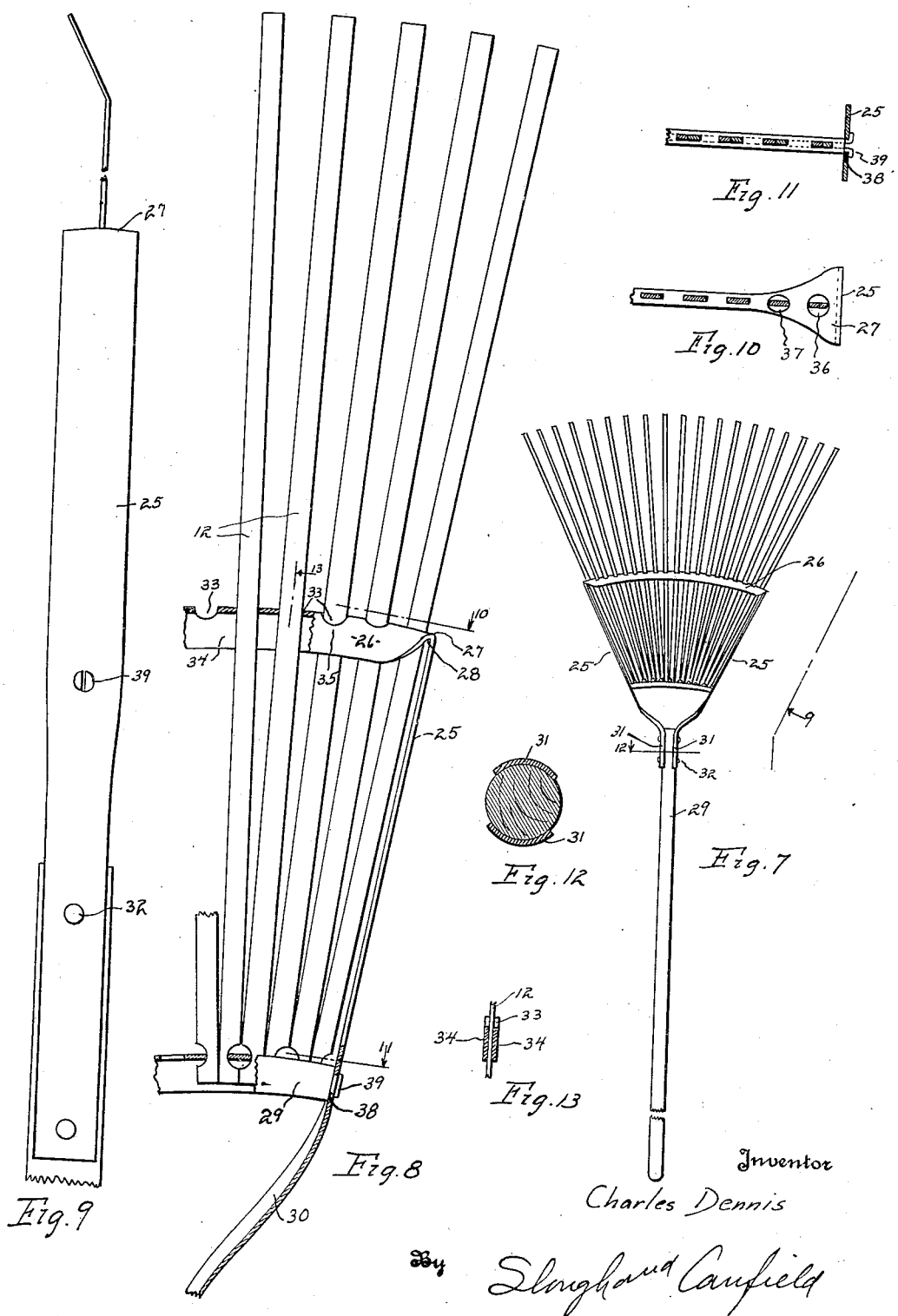

Patented Sept. 27, 1932

1,879,924

UNITED STATES PATENT OFFICE

CHARLES DENNIS, OF JACKSON, MICHIGAN, ASSIGNOR TO THE AMERICAN FORK & HOE COMPANY, OF CLEVELAND, OHIO, A CORPORATION OF OHIO

RAKE

Application filed October 21, 1929. Serial No. 401,175.

This invention relates to rakes and particularly to the type of rakes commonly known as broom rakes.

One of the objects of this invention is to provide an improved form of metal tined broom rake.

Another object is to provide a broom rake having relatively thin flat resilient metal tines with improved means for mounting the tines in the rake head construction.

Another object is to provide a broom rake having an improved tine supporting structure in which hard resilient flat metal tines may be secured against displacement, but with freedom to bend and move resiliently when in operation.

Another object is to provide a broom rake in which tines of very simple pattern, made from strip steel, may be employed and securely fastened in the rake head.

Another object is to provide a broom rake composed of a minimum of parts, cheap to manufacture and assemble and efficient in operation.

Another object is to provide in a broom rake having resilient metal tines, an improved mounting and support for the tines by which they may be relatively loosely supported at points intermediate their ends to facilitate the free bending thereof, but by which at the same time noise or rattling thereof will be prevented.

Other objects will be apparent to those skilled in the art to which my invention pertains.

My invention is fully disclosed in the following description taken in connection with the accompanying drawings, in which:—

Fig. 1 is an elevational view of a broom rake showing one embodiment of my invention;

Fig. 2 is a fragmentary view similar to Fig. 1 drawn to a larger scale and with some of the parts broken away;

Fig. 3 is a view taken from the plane 3 of Fig. 2;

Fig. 4 is a fragmentary sectional view taken from the plane 4 of Fig. 2;

Fig. 5 is a fragmentary sectional view taken from the plane 5 of Fig. 2;

Fig. 6 is a fragmentary sectional view taken from the plane 6 of Fig. 2;

Fig. 7 is an elevational view of a broom rake embodying my invention in another form thereof;

Fig. 8 is a fragmentary view of the rake of Fig. 7 drawn to a larger scale;

Fig. 9 is a view taken from the plane 9 of Fig. 7 and drawn to a larger scale;

Fig. 10 is a fragmentary sectional view taken from the plane 10 of Fig. 8;

Fig. 11 is a fragmentary sectional view taken from the plane 11 of Fig. 8;

Fig. 12 is a sectional view taken from the plane 12 of Fig. 7;

Fig. 13 is a fragmentary sectional view taken from the plane 13 of Fig. 8.

Referring to the drawings, Figs. 1 to 6 inclusive, I show at 1 a round handle, preferably made of wood, which has been split as by sawing longitudinally at one end thereof to provide two branches 2—2 to which the rake head and tine elements are adapted to be secured. The branches 2—2 are bent or spread apart to V-shape. Adjacent the outer ends of the branches 2—2, transverse holes 3—3 are provided, and at a suitably spaced distance therefrom, holes 4—4 are provided, into which, in a manner to be described, are inserted the lateral ends of tine supporting head elements 5 and 6.

The head element 5 is formed from sheet metal into arcuate form and of flat U section as shown in Figs. 4, 5 and 6. The legs 6—6 of the U are substantially planular, and the element 5 thus formed is bent edge-wise concave along the open edge 7 and convex along the closed edge 8 of the element 5, as shown in Figs. 1 and 2. The extreme ends of the head element 5 are inserted into the holes 3 in the wood side branches 2 of the handle. The closed edge 8 of the head element 5 is provided with a series of spaced perforations 11—11.

The rake tines 12—12 are preferably made from flat thin resilient metal, such as steel, and the extreme outer ends thereof may be bent at an angle, as shown at 13 in Fig. 3, to present the ends thereof to the ground in a suitable direction for efficient raking.

The tines 12 thus formed pass through the perforations 11 in the head element 5. The inner ends of the tines 12 are secured to the head element 6 and the head element 6 is constructed as will presently be described. The tines 12 may fit loosely in the perforations 11 and the tines will thereby have free bending movement, but will at the same time be held against displacement relative to each other.

The head element 6 is in general similar to the head element 5 being formed from sheet metal and in cross-section being of flat U-shape. The closed edge 14 of the head element 6 is provided with a series of elongated perforations 15, similar to the perforations 11 in the head element 5. At the extreme lateral ends of the head element 6, the closed edge 14 is slitted, as at 18, Fig. 5, to disconnect the side legs 16 of the U-shape section, thus providing a pair of tongues 17—17. The tongues 17 are inserted through the holes 4 in the wood side branches 2, above referred to, and as illustrated in Fig. 5, the tongues 17 are bent around the wood branches 2 in opposite directions to securely anchor the head element 6 in the branches 2—2.

The inner ends of the tines 12 are each provided with a notch 19 adjacent the end thereof, thus providing a neck 20 adjacent the end of each tine. Also, in assembling, the tines are disposed in pairs, so that the notches 19 in two adjacent tines, such as the tines 12a and 12b face each other and the notches 19 of the next adjacent pair, such as the tines 12c and 12d face each other. In assembling the tines in the head element 6, the neck 20 of adjacent tines, such as the tines 12b and 12c are disposed in a common perforation 15. Thus, the inner ends of the tines 12 are securely hooked or anchored in the perforations 15 of the head element 6.

If preferred, the necks 20 may be assembled in the perforations 15 before the final U-shape is given to the head element 6, and therefore at the time of assembling the necks in the perforations, the perforations may be of such width transversely of the head element 6 as to permit one tine to overlap another to facilitate inserting the tines or the necks thereof into the perforations, and after they have been inserted in the perforations and disposed with the edges of adjacent tines in mutual engagement, that is to say with all of the tines in a plane, then a final forming operation may be given to the head element 6 to mash it to its final flat U-form to prevent the tines from shifting in the perforations 15 and to cause the necks 20 to permanently engage the edges of the perforations 15.

Preferably, the branches 2 of the wood handle are permitted to retain their resilience and tend to return to their original positions in alignment with the handle 1 and they, therefore exert resilient pressure toward each other. This pressure is preferably taken up by engagement of the inner faces 22 of the branches 2 engaging the outer tines, such as the tine 23, Fig. 2, but, this is not an essential feature of my invention. If preferred on the other hand, the tongues 17 may be utilized to draw the side branches 2 toward each other and thus clamp the side branches against the outer tines 23.

I thus provide a broom rake, the flat resilient tines of which may individually bend in the operation of the rake and which tines have the necessary freedom of movement and at the same time cannot be displaced relative to each other, nor to the heads supporting them, and the rake as a whole is constructed from a minimum of parts of simple construction.

In the form of my invention shown in Figs. 7 to 13 inclusive, side extensions 25—25, formed integrally with a head element 26, take the place of the branches 2—2 of the handle in the form first described above. The head element 26 is very similar to the head element 5 of the other form, but at its lateral terminations, the sheet metal thereof bends out of the flat U section into a plane, as at 27, and then bends at a substantially right angle, as at 28, and continues as the extensions 25. The extensions 25 are substantially planular as far as the lower head 29 and there, beyond the head 29, to add strength to the extensions, they are made arcuate in cross-section, as indicated at 30 in Fig. 8, and at the lower terminations thereof are formed into the two parallel handle socket members 31—31 in which the handle 29 is secured by bolts or rivets 32.

In this form of my invention, the perforations 33 in the head 26 are initially made circular or substantially so, and when the head 26 is formed or mashed down into the flat U section, Fig. 13, the side walls 34—34 of the U are brought into close proximity with the tines 12—12 to prevent undue looseness or movement thereof in the perforations. The side elevational appearance of the perforations and their relation to the tines 12 is shown clearly at 35 in Fig. 8. The first two perforations 36 and 37, as shown in Fig. 10, retain all or part of their circular form due to the head 26 at this point bending outward to form the planular form above referred to.

The head 29 is substantially the same as the head 6 of the first form described, but the extreme lateral ends thereof are preferably reduced in size and passed outwardly through perforations 38 in the extensions 25 and bent or riveted over as at 39, Figs. 8, 9 and 11, to secure the head 29 to the extensions 25.

In both of the forms of my invention above described, the rake tines 12 may be very cheaply manufactured from flat material without twisting or otherwise forming the same to enable them to be secured in the rake head construction, all that is necessary in this connection being to punch or otherwise cut out the notch 19 to provide the neck 20. Furthermore, the notched ends of the tines may be rigidly secured in the head 6 by mashing the side legs of the channel flat against the flat faces of the tines, whereas, the tines may be free to move longitudinally in the perforations 11 of the head element 5, facilitating their bending when the rake is used.

In this connection also, the flat channel construction of the heads permits varying the fit of the tines in the perforations 11 and 15 thereof as desired. The side legs of the channel may be mashed down more or less as desired. In the case of the head element 5 (or 34) for instance, the channel may be mashed to engage the flat faces of the tines 12 to permit them to have sliding movement longitudinally and at the same time to prevent their rattling therein disagreeably without the necessity of providing an accurately sized perforation 11.

My invention is not limited to the exact details of construction shown and described, but may be embodied in other forms of rake which will occur to those skilled in the art and within the scope of my invention as defined in the following claims.

I claim:

1. In a broom rake, a handle, a tine supporting head construction, a plurality of resilient tines supported in the head and disposed fan wise converging toward the handle, a head element disposed transversely of the plurality of tines, and adapted to support the tines between their ends, the head element being arcuate concavely toward the handle end of the tines, of channel shape in cross section and provided with tine receiving perforations in the web of the channel, a second head element between the first head element and the handle and adjacent the converging ends of the tines, the second head element being arcuate, concave toward the handle and of generally channel shape in cross section provided with perforations in the web of the channel, each tine being provided with a neck adjacent its inner end, the necks of two adjacent tines being disposed in a perforation of the second head element and means for connecting the head elements to the handle.

2. In a broom rake, a handle, a plurality of tines, a tine supporting head construction, the tines being composed of resilient flat material and arranged fan wise converging toward the handle, a first head element for supporting the tines at a point between their ends, a second head element for supporting the tines at their inner ends, the first head element being disposed transversely of the plurality of tines, and generally of channel section with a plurality of spaced perforations in the web portion of the channel, each of said perforations enclosing a tine, the said second head element being generally of channel section and extending transversely with respect to the tines and provided with a plurality of spaced perforations in the web of the channel, each of the tines being provided with a neck adjacent its inner end and the tines being disposed generally in pairs with necks of two adjacent tines in a common perforation of the second head element, and means for connecting the head elements to the handle.

3. In a broom rake, a handle, a head element and a plurality of tines, the head element disposed transversely of the tines and provided with a series of perforations, each of the tines being provided with a neck adjacent its end, the tines being disposed in pairs of adjacent tines and with the necks of each pair in one of the perforations of the head element.

4. In a broom rake, a head element, a plurality of tines secured therein, the tines being formed from flat resilient metal and adjacent their ends being provided each with a notch in an edge thereof, to provide a neck adjacent the end of the tine, the head element being provided with a plurality of perforations adapted to embrace the tines at said necks and the tines being disposed in pairs with the necks of each pair embraced by one of said perforations.

5. In a broom rake, a plurality of resilient tines, each of the tines being provided with a neck adjacent one end thereof, a head element, in general of U-shape in cross section and extending transversely across the plurality of tines, the tines being disposed generally in pairs with the neck portions of each pair adjacent to each other, the pairs of necks being adapted to be enclosed by the said perforations, a second head disposed transversely across the tines for supporting them at points between their ends, a rake handle and means for supporting the heads on the handle.

6. In a broom rake, a handle, a plurality of resilient tines disposed fan-wise converging toward the handle, the inner ends of the tines lying adjacent to each other, a head element connected to the handle disposed transversely of the tines adjacent their inner ends and provided with a plurality of perforations, each of the tines being provided with a neck adjacent its inner end, the tines being arranged in pairs with the necks of each pair adjacent to each other and adapted to be enclosed by one of the said perforations, a second head element connected to the handle and adapted to support the tines at points between their ends.

7. In a broom rake, a handle, a plurality of tines formed from flat relatively thin resilient material disposed fan-wise converging toward the handle, a head element connected to the handle disposed transversely of the tines adjacent their inner ends formed from sheet metal of generally channel cross-section provided with a plurality of tine receiving perforations in the web of the channel, each of the tines being provided with a notch in one edge thereof adjacent the inner end of the tine, the tines being disposed in pairs with the necks of each pair adjacent to each other and the necks of each pair being enclosed in one of said perforations, the legs of the channel being pressed flat into engagement with the flat sides of the tines, a second head element disposed transversely of the tines at points between their ends formed from sheet metal and provided with a plurality of spaced tine enclosing perforations, means for connecting the head element to the handle to support the same in spaced relation to each other longitudinally of the tines.

8. In a broom rake, a tine supporting head construction, a plurality of resilient tines supported in the head and disposed fan-wise converging toward the handle, the head construction comprising a head element disposed transversely of the tines generally of channel form provided with tine embracing perforations in the web of the channel, and at the opposite ends of the head element, the material thereof being bent to form converging side elements, the ends of the side elements being bent inwardly and formed to generally channel section and terminating in two parallel handle embracing portions, means for connecting the handle embracing portions to the handle, and a second head element disposed generally transversely of the tines, generally of channel section provided with tine embracing perforations in the web of the channel and the opposite ends of the head element being secured to the said side elements.

9. In a broom rake, a tine supporting head construction, a plurality of resilient tines supported in the head and disposed fan-wise converging toward the handle, the head construction comprising a head element disposed transversely of the tines generally of channel form provided with tie embracing perforations in the web of the channel, and at the opposite ends of the head element, the material thereof being bent to form converging side elements, the ends of the side elements being bent inwardly and formed to generally channel section and terminating in two parallel handle embracing portions, means for connecting the handle embracing portions to the handle, and a second head element disposed generally transversely of the tines, generally of channel section provided with tine embracing perforations in the web of the channel and the opposite ends of the head element being secured to the said side elements, the said channel form head elements being adapted to be mashed flat to cause the side legs of the second head element to grip the tines at the inner ends thereof and to cause the first mentioned head element to engage the tines to permit them to move longitudinally in the perforations thereof without rattling.

In testimony whereof I hereunto affix my signature this 9th day of October, 1929.

CHARLES DENNIS.